United States Patent [19]

Lipo

[11] Patent Number: 4,724,373
[45] Date of Patent: Feb. 9, 1988

[54] METHOD AND APPARATUS FOR FLUX AND TORQUE SENSING IN ELECTRICAL MACHINES

[75] Inventor: Thomas A. Lipo, Madison, Wis.

[73] Assignee: Wisconsin Alumni Research Foundation, Madison, Wis.

[21] Appl. No.: 15,506

[22] Filed: Feb. 9, 1987

Related U.S. Application Data

[63] Continuation of Ser. No. 831,995, Feb. 20, 1986, abandoned.

[51] Int. Cl.⁴ .............................................. H02P 5/40
[52] U.S. Cl. .................................. 318/805; 318/798; 318/806; 324/158 MG
[58] Field of Search ............... 318/805, 806, 803, 798; 324/158 MG

[56] References Cited

U.S. PATENT DOCUMENTS

| | | | |
|---|---|---|---|
| 3,909,687 | 9/1975 | Abbondanti | 318/805 |
| 4,011,489 | 3/1977 | Franz et al. | |
| 4,023,083 | 5/1977 | Plunkett | |
| 4,044,285 | 8/1977 | Plunkett et al. | |
| 4,245,181 | 1/1981 | Plunkett | 318/805 |
| 4,280,085 | 7/1981 | Cutler et al. | 318/803 |
| 4,361,791 | 11/1982 | Plunkett | |
| 4,431,957 | 2/1984 | Chausse et al. | 318/805 |
| 4,470,000 | 9/1984 | Heinle | 318/805 |

OTHER PUBLICATIONS

Lipo et al., "A New Approach to Flux and Torque Sensing in Induction Machines", Industry Applications Society, IEEE-IAS-1985 Annual Meeting, Toronto Canada, Oct. 6-11.

Chang, K. C., Masters Thesis, University of Wisconsin Memorial Library, Feb. 21, 1985.

*Primary Examiner*—David Smith, Jr.
*Attorney, Agent, or Firm*—Isaksen, Lathrop, Esch, Hart & Clark

[57] ABSTRACT

To determine the flux in the air gap of an electrical machine having distributed stator windings, the voltages across two coils of a phase belt in certain phases of the stator are measured and the voltage across one coil in each phase belt is subtracted from the voltage in the other coil. The voltage differences are integrated to provide a measure of the air gap flux. Measurement of the entire air gap flux about the machine can be obtained utilizing two coils in a phase belt per phase of the machine. The instantaneous electromagnetic torque in the machine can be calculated directly as a function of the calculated air gap flux and of the currents in the stator windings. Such flux and torque measurements are obtained utilizing electrical connections to the existing coils of the machine, without the need to modify the machine by adding further windings or sensors. The flux and torque signals so obtained may be utilized in motor controllers, and are particularly useful for control of AC induction motors.

44 Claims, 9 Drawing Figures

PHASE "a" WINDING

FIG. 9 the machine at all times, it is necessary to have measurements across coils in at least two of the phases in a three phase machine, although it is preferred that measurements be obtained on coils in all three phases.

METHOD AND APPARATUS FOR FLUX AND TORQUE SENSING IN ELECTRICAL MACHINES

This application is a continuation of application Ser. No. 831,995, filed Feb. 20, 1986, now abandoned.

FIELD OF THE INVENTION

This invention pertains generally to the field of AC electrical machines and controllers therefor, and particularly to the measurement of torque and flux for monitoring and control of the machines.

BACKGROUND ART

Recent advances in the control of AC electrical machines have depended upon evolution of the principle of field orientation. This control concept views the AC currents and flux linkages in the machine as rotating vectors in a two dimensional space (i.e., in a plane). The production of torque may be viewed as the interaction of the stator current vector and the rotor flux linkage vector. The required value of electro-magnetic torque together with a desirable value of air gap flux may be obtained by proper alignment of the stator current vector with respect to the rotor flux linkage vector. Since this control scheme requires orientation of the stator current with respect to the rotor flux, a key requirement of the control scheme is the computation of the instantaneous location of the rotating flux linkage vector. While the flux linkage vector may be easily located for a synchronous machine by using a rotor position sensor, locating the rotating flux linkage vector is considerably more difficult in an induction machine since the position of the rotor is not directly related to the rotor flux position because of the rotor slip.

Present schemes for the control of induction machines use the so-called indirect field orientation method in which the rotor flux is located only indirectly by measuring the rotor speed and calculating the rotor slip frequency. This approach is inherently inaccurate since it relies on a precise knowledge of the rotor resistance and inductance, quantities which change with changes in temperature and the saturation level in the iron of the machine. The problems associated with the indirect approach could be avoided by direct measurement of the rotor flux or, alternatively, the air gap flux. Present state of the art, however, requires the use of either search coils or Hall sensors to measure rotor flux or air gap flux.

Search coils are small coils made of very thin wire which are placed in selected slots of the stator of the machine. The voltages induced in these coils are sensed and then integrated to produce a measure of the flux linking the coils. Incorporating such flux coils in a machine necessarily requires extra operations in the manufacture of the armature winding of the machine and therefore increases the cost of the machine. In addition, since the coils are formed of very thin wire (e.g., approximately 40 gauge), they are subject to breakage over time due to vibration or continual flexing. Repair of the search coils requires removal of the tooth top insulator strip from the stator slots containing the flux search coil. In addition to being expensive, such a repair procedure can contribute to insulation failure of the motor coils upon reassembly. Hall sensors are also unreliable as they are very sensitive to temperature. Because the armature coils are one of the hottest parts within the machine, placement of Hall sensors in the stator armature has rarely, if ever, been attempted on a commercial level. Thus, a need has existed for a low cost and reliable way of sensing flux in an induction machine as a key to solving many of the problems inherent in the present designs of variable frequency induction motor drives.

SUMMARY OF THE INVENTION

In accordance with the present invention, accurate measurement of the air gap flux is obtained utilizing measurement of voltages across the existing stator coils without modification of the machine except for additional leads extending to the internal coils to allow measurement of the voltages across the coils. The flux measurements can be obtained for any machine, synchronous or induction, having a lap wound stator with a distribution over at least two stator slots. Two coils of a phase belt, preferably the outer two coils, are selected as the flux sensing coils and the voltages across the two coils are measured and the voltage of one coil is subtracted from the other. The voltage difference can be integrated to provide a measure of the instantaneous air gap flux. If the two coils chosen are displaced an equal number of electrical degrees from the voltage which is in phase with the voltage across the entire phase to which the coils belong, the integral of the voltage difference will be a measure of the instantaneous air gap flux at a direction displaced 90° with respect to the phase axis.

It is found that by subtraction of the voltages across the two coils, certain parasitic terms which would normally produce error in the flux measurement are eliminated. In general, the voltage induced in a given coil is composed of three components: the desired air gap flux component, a voltage drop due to leakage flux, and a resistive drop due to the current flowing through the resistance of the coil. However, the leakage flux and resistive drop are dependent only on the current that flows in the coil itself, and not to current in some other coil. Since the same identical current flows through the two coils in the phase belt whose voltages are measured, as they are connected in series, the resistive voltage drop and the leakage reactance voltage drop cancel exactly, and the voltage component which is left is a direct measurement of air gap flux.

Generally, measurement of the entire amplitude and spatial position of the air gap flux about the machine can be obtained utilizing two coils in a phase belt per phase of the machine. A machine formed in accordance with the invention will thus utilize four leads for each phase, two extending to each of the two selected coils in each phase, although only three additional leads per phase are necessary if one of the phase terminals is utilized as a lead and the coil adjacent to the phase terminal is selected as one of the coils to be measured. To obtain a complete measurement of the flux location within the machine at all times, it is necessary to have measurements across coils in at least two of the phases in a three phase machine, although it is preferred that measurements be obtained on coils in all three phases.

Utilizing the flux measurement signals obtained in the foregoing manner, the instantaneous torque in the machine can be calculated directly as a function of the measured flux signals and of signals indicative of the current in the stator windings. The signal so obtained which is indicative of torque may thus be directly compared with a desired input torque signal to provide a feedback error signal which can be supplied to control an inverter to drive the motor to achieve the desired torque. The signals indicative of flux may similarly be utilized as error feedback signals to control the inverter.

Further objects, features, and advantages of the invention will be apparent from the following detailed description when taken in conjunction with the accompanying drawings.

DESCRIPTION OF THE PREFERRED EMBODIMENT

Figures 1, 2, 3, 4:
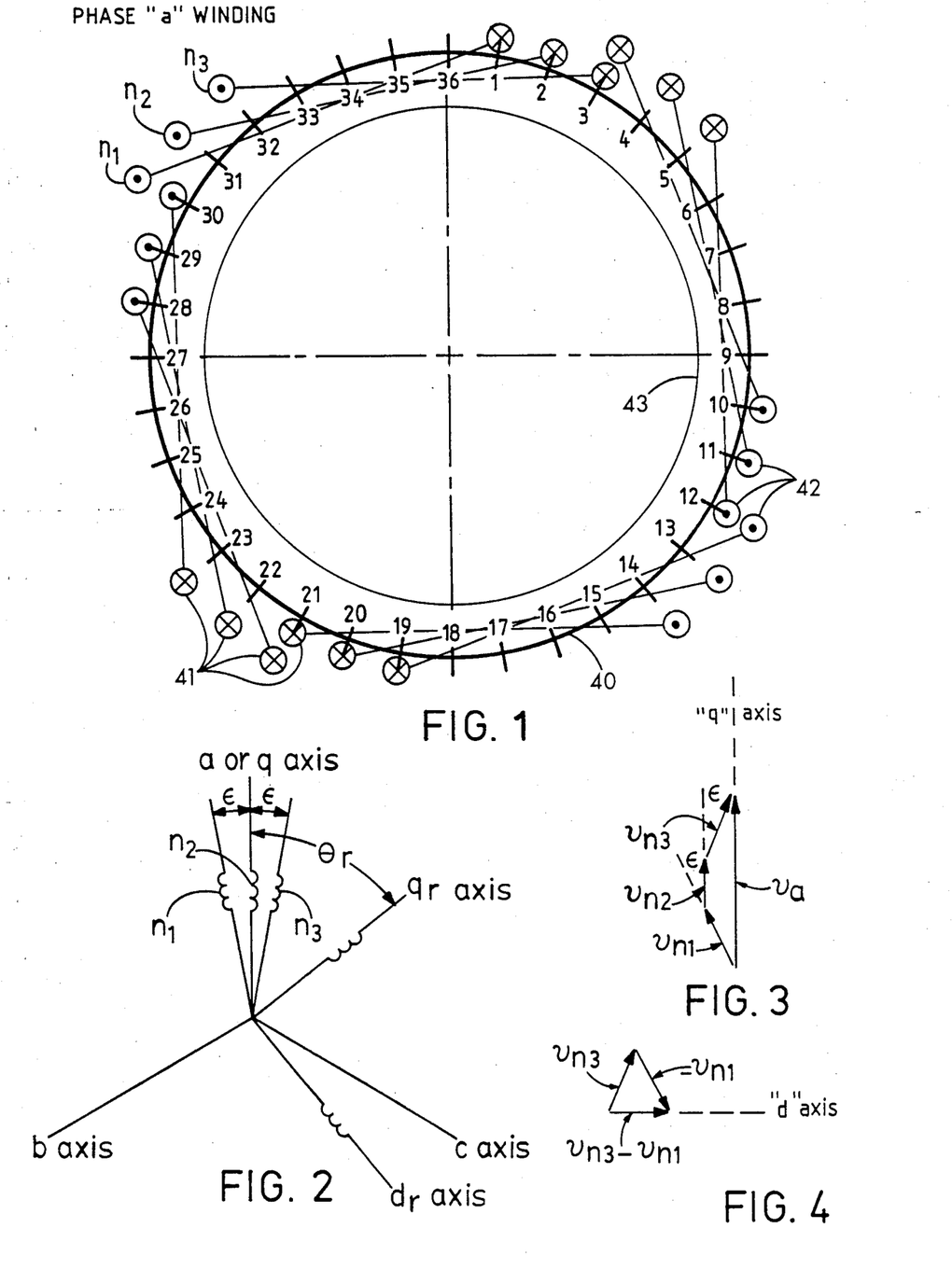
FIG. 1 is a schematic diagram illustrating the placement of stator coils in a typical electrical machine with which the invention may be utilized.
FIG. 2 is a diagram showing the orientation of the sensed coils in electrical degrees relative to the stator and rotor magnetic axes.
FIG. 3 is a phasor diagram illustrating addition of voltages in the phase belt containing the sensed coils.
FIG. 4 is a phasor diagram illustrating subtraction of voltvoltages in the sensed coils.

To illustrate the implementation of the invention, reference may be had to the drawings and particularly to FIG. 1 which shows in schematic form a common placement of coils around the stator of a typical 36 slot, 4 pole machine. The 36 slots are illustrated by the cross lines around the periphery of the circle 40 which corresponds to the inner periphery of the stator, with the individual slots being labeled 1-36. The windings shown correspond to one of the three phases of the machine (labeled phase "A") with the windings of the other two phases not shown for clarity of illustration. As conventional, current flowing in a winding into the paper is represented by the circles 41 marked with an X and the windings having current flowing out of the paper are illustrated by the circles 42 with a dot. The outer periphery of the rotor is illustrated generally by the line 43 in FIG. 1, with the inner periphery 40 of the stator spaced from the outer periphery 43 of the rotor to define an air gap therebetween. The flux and torque measurement principles of the invention are applicable to any machine having appropriately formed stator windings. Thus, the construction of the rotor may be selected as desired so that the machine operates as a synchronous, induction, reluctance or permanent magnet machine.

The stator winding illustrated in FIG. 1 is commonly known as a double layer lap winding and is the most popular pattern for winding AC induction or synchronous machine armatures. The winding is a double layer winding because wires from two separate coils are disposed in each slot. It should be noted that the winding which makes up a phase actually consists of a number of individual coils which are connected in series or parallel to form a given phase winding. The coils in a particular phase which are located in the same part of consecutive slots are commonly known as a phase belt (sometimes called a "group") and are always connected in series to result in phasor addition of the induced voltages in the coils. It should be borne in mind that the distribution of the coils of the other two phases of the machine is identical to that of the phase A winding shown in FIG. 1 but displaced appropriately with respect to phase A in the slots of the machine. The winding pattern illustrated in FIG. 1 has a two slot pitch, although other selections of the pitch may be incorporated in machines in accordance with the invention, including a one slot pitch and unity pitch in which the second layer of windings in each slot would overlay another coil from the same phase. The invention may also be utilized with single layer and three layer distributed windings.

To illustrate the principles of the invention, the voltages induced in the coils of one phase belt of phase A labeled n1 and n3 in FIG. 1 may now be considered. These two coils are, in general, displaced spatially from each other by an electrical angle, e.g., $2\epsilon$. The voltages induced in these two coils will therefore be out of phase by the same angle $2\epsilon$. The induced voltages in the two coils can be diagrammed with respect to the three normal phase voltages in the phase diagram of FIG. 2, in which the middle coil, labeled n2, lies along the axis of and is in phase with the phase A voltage. In general, the voltages induced in the two coils n1 and n3 are normally summed together with the voltage in the middle coil n2 of the phase belt to produce a voltage which is in phase with phase A, as illustrated by the diagram of FIG. 3. However, if the voltages induced in the two coils n1 and n3 are subtracted rather than added, the voltage difference is displaced 90° with respect to phase A. This 90° displaced component is sometimes called the d component in electrical machine analysis. The time varying voltage difference can then be integrated to estimate the instantaneous air gap flux in a particular direction.

It may be noted that the subtracting process eliminates certain parasitic terms which would normally produce error if the flux measurement were taken across the entire phase belt. This may be seen from noting that the voltage induced in any given coil is composed of three components: (1) the air gap flux component which is desired to be measured, (2) a voltage drop due to leakage flux, and (3) a resistive IR drop due to the current passing through the resistance of the coil. However, factors (2) and (3) are dependent only on the current that flows through the coil itself, and are not a function of current in some other coil which is mutually coupled to the coil being measured. Since the identical current flows through coils n1 and n3, because the coils are connected in series, the resistive drop and the leakage reactance drop cancel when the difference of the voltages across the two coils is taken, and the voltage component which remains is a direct measure of air gap flux.

Although the discussion above shows how air flux may be sensed in the sinusoidal steady state, a more rigorous approach will demonstrate that the technique remains valid even under transient conditions. FIG. 2 depicts the two coils $n_1$ and $n_3$ mutually displaced with respect to the phase a axis by $\epsilon$. In general, the voltages induced into these two coils are, for coil $n_1$ and $n_3$ respectively, $$v_{n1} = r_1 i_{as} + d\lambda_{1s}/dt + d\lambda_{1r}/dt$$

and $$v_{n3} = r_1 i_{as} + d\lambda_{3s}/dt + d\lambda_{3r}/dt$$

where $\lambda_{1s}$ and $\lambda_{3s}$ denotes the total flux linking the coils $n_1$ and $n_3$ due to the three stator phase currents, and $\lambda_{1r}$ and $\lambda_{3r}$ represents the flux linking coils $n_1$ and $n_3$ due to rotor currents. Note that since the coils are identical, the resistances ($r_1$) of both coils are equal and the current ($i_{as}$) flowing through them is the same. The voltage difference between coil 3 and coil 1 is $$v_{n3} - v_{n1} = (d\lambda_{3s}/dt - d\lambda_{1s}/dt) + (d\lambda_{3r}/dt - d\lambda_{1r}/dt)$$

It can be noted immediately that the ir term drops out of the equation above and therefore the voltage difference is independent of stator resistance.

It is useful to consider the flux linking the coil from the stator currents and from the rotor currents (for synchronous and induction machines) separately. The flux linking coil $n_1$ due to stator currents can be separated into leakage components corresponding to flux lines which do not link the rotor and air gap components resulting from flux which crosses the gap and therefore links the rotor. That is, let $$\lambda_{1s} = \lambda_{1ls} + \lambda_{1ms}$$

$$\lambda_{3s} = \lambda_{3Ls} + \lambda_{3ms}$$

When the pitch is not unity, the double layer lap winding results in slots containing coils associated with different phases. In this case, it can be noted that a "mutual coupling" exists which is associated only with leakage flux components. If $L_{LT}$ and $L_{LB}$ denote the leakage inductances associated with coil sides in the top and bottom of the slot and if $L_{TB}$ denotes the "mutual coupling" of coils in the top and bottom of the slot, the leakage portion of the two coil flux linkages can be written as:

$$\lambda_{1ls} = (L_{LT} + L_{LB}) i_{as} + L_{lTB} i_{as} - i_{bs} L_{LTB} + L_{Ls} i_{as}$$

$$\lambda_{3Ls} = (L_{LT} + L_{LB}) i_{as} + L_{lTB} i_{as} - i_{cs} L_{lTB} + L_{Ls} i_{as}$$

In the equations above the additional term $L_{Ls} i_{as}$ has been introduced to represent end winding, belt and zig zag leakage components which are assumed not to have "mutual leakage" components.

When the equations above are subtracted the difference between the leakage flux in the two coils is $$\lambda_{3Ls} - \lambda_{1Ls} = -(L_{lTB})(i_{bs} + i_{cs})$$

However, since the sum of the three currents add to zero, the equation above can be written, $$\lambda_{3Ls} - \lambda_{1Ls} = L_{lTB} i_{as}$$

The equation above can be written in terms of d-q current components if the machine has no neutral return, as $$i_{as} = i_{qs}^s$$

so that $$\lambda_{3Ls} - \lambda_{1Ls} = L_{lTB} i_{qs}^s$$

Ideally, subtraction of the two leakage flux components should result in completion cancellation. The right hand side of the equation above can therefore be considered as a parasitic error term. However, its effect can be shown to be negligibly small for practical slot geometries. It can be observed that this term can be completely cancelled if the winding has a full pitch.

The remaining component of flux contributed by the stator currents is the air gap component. Since coils $n_1$ and $n_3$ are oriented symmetrically about the magnetic axis of phase a by the angle $\epsilon$, the air gap flux linking the two windings is $$\lambda_{1ms} = i_{as} L_{m1s} \cos \epsilon + i_{bs} L_{m1s} \cos(\epsilon + 120°) + i_{cs} \cos(\epsilon - 120°)$$

$$\lambda_{3ms} = i_{as} L_{m1s} \cos(-\epsilon) + i_{bs} L_{m1s} \cos(-\epsilon + 120°) + i_{cs} \cos(-\epsilon - 120°)$$

where $L_{m1s}$ denotes the mutual inductance between a single coil and the entire stator phase a winding. Here, it has been assumed that the three phase windings are sinusoidally distributed, or alternatively, that only the fundamental component of the winding distribution is considered to produce useful air gap flux.

Upon subtracting the first from the second equation above, the air gap component of stator flux sensed reduces to $$\lambda_{3ms} - \lambda_{1ms} = \sqrt{3} L_{m1s} \sin\epsilon (i_{cs} - i_{bs})$$

However, the direct axis voltage in the stationary reference frame is defined by $$i_{ds}^s = (1/\sqrt{3})(i_{cs} - i_{bs})$$

Hence, $$\lambda_{3ms} - \lambda_{1ms} = 3 L_{m1s} \sin \epsilon i_{ds}$$

The flux which links the two coils due to rotor current components is computed in a similar manner. However, in this case the rotation of the rotor with respect to the stationary coils requires a change in variables. For this purpose it is conventional to replace the actual currents in the rotor bars by equivalent two phase currents which produce the same fundamental MMF distribution. The location of the magnetic axes of these two phase currents with respect to stator phase a is shown FIG. 2. The flux which links the $n_1$ and $n_3$ coils due to currents in the rotor is $$\lambda_{1mr} = L_{m1r} i_{qr}^{'r} \cos(\theta_r + \epsilon) - L_{m1r} i_{dr}^{'r} \sin(\theta_r + \epsilon)$$

$$\lambda_{3mr} = L_{m1r} i_{qr}^{'r} \cos(\theta_r - \epsilon) - L_{m1r} i_{dr}^{'r} \sin(\theta_r - \epsilon)$$

where $L_{m1r}$ represents the maximum mutual coupling between one of the two sensing coils and one of the two equivalent d-q currents. Upon subtracting the second equation above from the first the following result is obtained $$\lambda_{3mr} - \lambda_{1mr} = -2 L_{m1r} \sin \epsilon (i_{qr}^{'r} \sin \theta_r + i_{dr}^{'r} \cos \theta_r)$$

However, from the d-q equations of transformation, it is possible to relate the rotor d-axis current in the rotor reference frame to the stator stationary reference frame by the transformation equation $$i_{dr}'^s = i_{qr}'^r \sin\theta_r + i_{dr}'^r \cos\theta_r$$

and substituting into the foregoing equation:

$$\lambda_{3mr} - \lambda_{1mr} = -2L_{m1r}\sin\epsilon\, i_{dr}'^s$$

Finally, it it can be shown that $$L_{m1r} = 3/2 L_{m1s}$$

where the 3/2 term appears because of the conversion of the rotor current from three phase to two phase variables. By combining several of the foregoing equations, the voltage difference between coils $n_3$ and $n_1$ can now be expressed in the form $$v_{3s} - v_{1s} = \frac{d}{dt}[L_{TB}i_{qs}^s + 3L_{m1s}\sin(i_{ds}^s + i_{dr}^s)]$$

When the first term is neglected, the equation above is, in effect, a measure of the air gap flux in the magnetic axis normal to the magnetic axis of the coils which comprise the phase belt. That is, when the voltages of coils 1 and 3 are added (together with coil 2) the voltages induced along the magnetic axis of phase a stator (as-axis) is obtained. However, when the voltages of coils $n_1$ and $n_3$ are subtracted, a measure of the time rate of change of air gap flux in the d-axis (axis normal to the as-axis) is obtained. It is important to note that since $L_{m1s}$ is proportional to the air gap inductance $L_{ms}$ of an entire phase, saturation of the magnetic circuit will affect $L_{m1s}$ and $L_{ms}$ equally. Hence, the equation above remains an accurate measure of flux even when saturation occurs.

The time rate of change of the air gap voltages along axes normal to the phase b stator and phase c stator axes can readily be determined in a similar manner. It is possible to obtain estimates of both of these quantities with only one additional measurement since, from Gauss' Law, the sum of the flux lines crossing the air gap must be zero. The air gap voltage in a third axis can therefore be obtained as the negative of the sum of the air gap voltages in the other two axes. The air gap flux at electrical right angles corresponding to each of the three phases can then be determined as the time integral of the voltage difference for each phase; specifically:

$$\lambda_{13a} = \int (v_1 - v_3)_a dt$$

$$\lambda_{13b} = \int (v_1 - v_3)_b dt$$

$$\lambda_{13c} = \int (v_1 - v_3)_c dt$$

where $(v_1-v_3)_a$ is the voltage difference for the two coils of phase a, $(v_1-v_3)_b$ is the voltage difference for phase b, and $(v_1-v_3)_c$ is the voltage difference for phase c.

Figure 5:
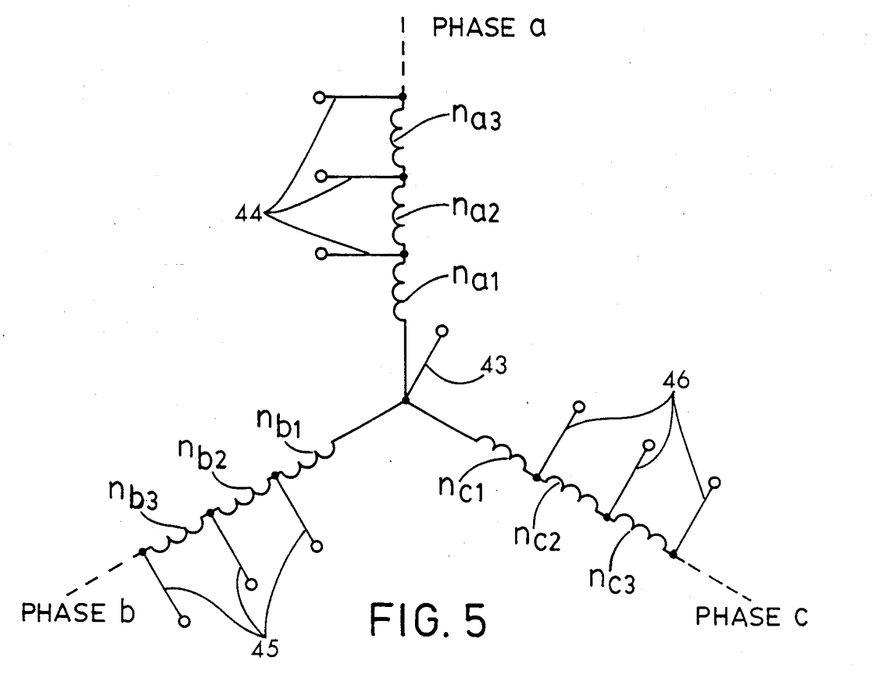
FIG. 5 is a schematic wiring diagram illustrating a typical arrangement of electrical lead connections for a three phase machine in accordance with the present invention.

The measurement of the voltages across the various coils can be easily accomplished by bringing out extra wires from the stator coils so that the voltages induced in individual coils can be conveniently accessed. This is illustrated in FIG. 5 for a Y connected three phase stator winding in which the phase belt coils for each phase are adjacent to the star point, to which a lead 43 is connected. The other phase belts for the other poles of the machine are not shown in FIG. 5, and generally would not require additional leads attached to them.

Each of the three phases has an additional three electrical leads connected across the phase belt coils, leads 44 extending to connection to the ends of the outermost coils of the phase belt for phase a, and similar leads 45 for phase b and leads 46 for phase c. The leads 43, 44, 45, and 46 all preferably extend to terminals outside the case of the machine or to a terminal block within the case which can be readily accessed to allow connection of external lines to the terminals. The voltage across the first coil adjacent to the Y connection point can be measured as the voltage between the Y common lead 43 and the next adjacent lead. Similarly, the voltage across the outermost coil in the sets of three would be the voltage across the outermost two leads in each of the three phases. To obtain flux measurement for all three phases, the minimum number of additional leads that must be connected to the machine, over and above the leads ordinarily provided on such three phase machines, is three per phase. It is noted from an examination of FIG. 5 that although two leads are required to obtain the voltage across each of the two coils in each phase belt, one of the leads is already available as one of the phase terminals if the phase belt chosen for measurement is the belt adjacent to a phase terminal or the star point. Installation of these leads is provided in at least two of the three phases to have a complete measurement of the flux location at all instants. The additional leads required in a machine in accordance with the present invention can be readily incorporated during the manufacturing process, as tapping the coils at the desired connection points between coils does not require substantial additional time or effort in the machine assembly process. In contrast to the relatively fine gauge wire required for conventional flux search coils, which is fragile and easily damaged, relatively heavy insulated wire can be used for the leads 44, 45 and 46, so that placement of the leads is easily accomplished using normal motor assembly procedures, and the leads will be no more subject to breakage or insulation damage than the other wires within the machine.

While the machine of FIG. 1 was illustrated having a pitch of two slot pitches (7/9 pitch), it is clear that the present invention mav be utilized in any lap wound machine having a distribution over at least two slots. It is preferred in applying the flux sensing scheme that the outer two coils of one phase belt be selected as the flux sensing coils, about which the voltages are measured and subtracted, so that the coils are symmetrically displaced from the phase axis and the angle between the coils is as large as possible.

In the foregoing manner, the status of the flux in the air gap can be obtained reliably and accurately. From this air gap flux information it is possible now to calculate directly the electromagnetic torque. In general, the electromagnetic torque for the machine of FIG. 1 may be expressed in terms of the d-q air gap flux and stator currents by:

$$T_e = (3/2)(P/2)(\lambda_{md}i_{qs} - \lambda_{mq}i_{ds})$$

or, more generally:

$$T_e = K_e P(\lambda_{md}i_{qs} - \lambda_{mq}i_{ds})$$

where $K_e$ is a constant and P is the number of poles of the machine.

Figure 6:
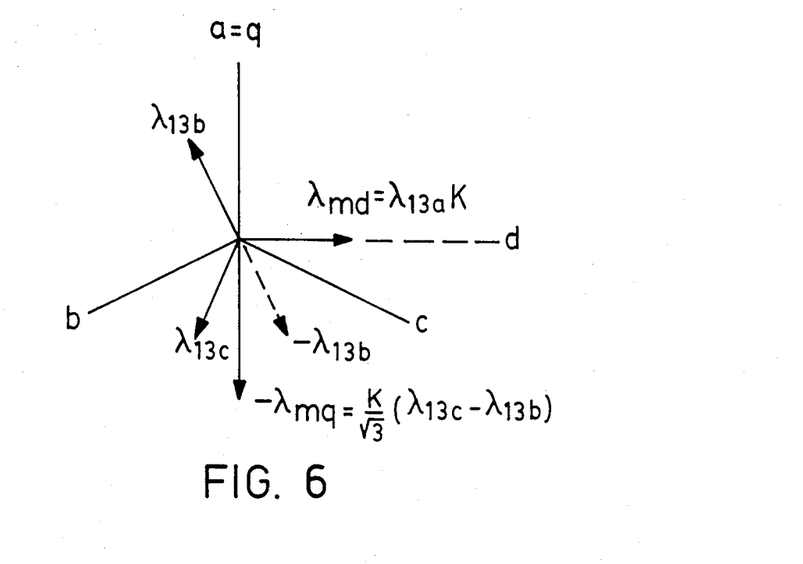
FIG. 6 is a diagram illustrating the measurement of the d axis and q axis flux in accordance with the invention.

The calculation of torque from the measured phase a, phase b and phase c flux to obtain the $\lambda_{md}$ and $\lambda_{mq}$ flux terms for the equation above is illustrated in the diagram of FIG. 6. The equation for torque $T_e$ above is the cross product of the air gap flux and the stator current. P is the number of poles of the machine; $\lambda_{md}$ and $\lambda_{mq}$ are the d axis and q axis flux; and $i_{ds}$ and $i_{qs}$ are the d and q axis stator currents, respectively. For a three phase machine, $$\lambda_{md} = K\lambda_{13a}, \quad -\lambda_{mq} = (K/\sqrt{3})(\lambda_{13c} - \lambda_{13b}), \quad i_{qs} = i_{as}, \text{ and}$$

$$i_{ds} = (1/\sqrt{3})(i_{cs} - i_{bs})$$

where $i_{as}$, $i_{bs}$ and $i_{cs}$ are the phase a, b and c stator currents, respectively, and K is a proportionality constant which may be evaluated by comparison of the electromagnetic torque so measured with torque determined by other measurement techniques.

Figure 7:
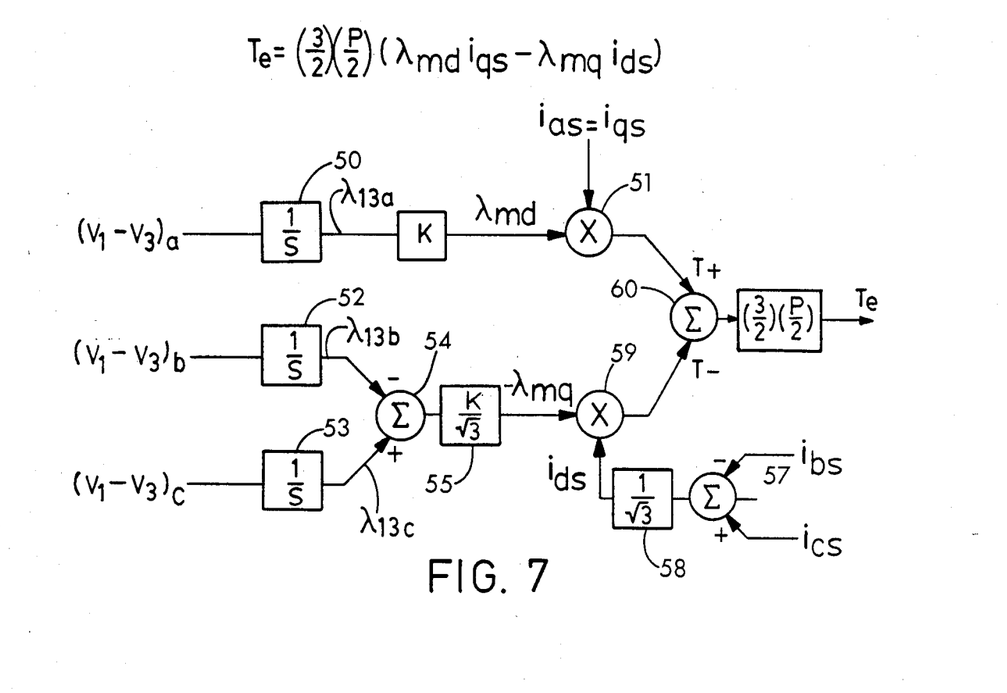
FIG. 7 is a block diagram of a system for calculating torque in accordance with the invention.

A block diagram of a system for calculating the actual instantaneous electromagnetic torque is shown in FIG. 7. The $(v_1-v_3)_a$ signal from phase A is integrated by an integrator 50 to obtain the d-axis air gap flux $\lambda_{md}$. By multiplying this d-axis flux with the q-axis current, $i_{qs}$, equal to the phase A stator current, at a multiplier 51, the positive component of the electromagnetic torque is obtained. To obtain the q-axis flux, the voltage difference $(v_1-v_3)_b$ signal for the B phase is integrated at an integrator 52 and the voltage difference for the C phase $(v_1-v_3)_c$ is integrated by an integrator 53, with the integral of the B phase signal subtracted from the integral of the C phase signal at a subtractor 54. The difference signal from the subtractor 54 is multiplied by the factor $K/\sqrt{3}$ at 55 to obtain the q-axis flux $-\lambda_{mq}$. The d-axis stator current is obtained by subtracting a signal $i_{bs}$ indicative of the B-phase stator current from the signal $i_{cs}$ indicative of the C-phase stator current at a subtractor 57 and multiplying the difference by $K/\sqrt{3}$ at 58 to obtain the d-axis stator current $i_{ds}$. Multiplication of the q-axis air gap flux with the d-axis stator current at a multiplier 59 yields the negative component of the electromagnetic torque. By summing the positive and negative components of the torque at an adder 60, the resultant electromagnetic torque $T_e$ is obtained.

Figure 8:
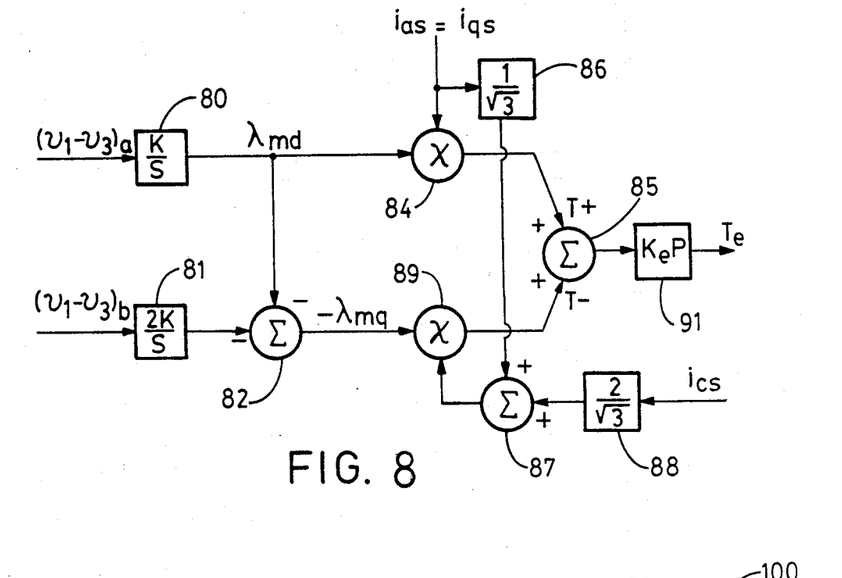
FIG. 8 is a block diagram of a modified system for calculating torque in accordance with the invention.

As previously noted, torque can be calculated utilizing measurements of voltages across coils in only two of the three phases, or, more generally, in the number of phases sufficient to determine the flux in the machine, as illustrated in the block diagram of FIG. 8. In this implementation, $$\lambda_{md} = K\int(v_1 - v_3)_a dt,$$
$$-\lambda_{mq} = -K\int(v_1 - v_3)_a dt - 2K\int(v_1 - v_3)_b dt,$$

$$i_{qs} = i_{as}, \quad i_{ds} = -1/\sqrt{3}\; i_{as} + 2/\sqrt{3}\; i_{cs}, \text{ and}$$

$$T_e = K_e P(\lambda_{md} i_{qs} - \lambda_{mq} i_{ds}),$$

where $K_e$ and K are constants and P is the number of poles.

The voltage difference for phase a is provided to an integrator 80 which yields the signal $\lambda_{md}$. The voltage difference for phase b is provided to an integrator 81, and the outputs of the integrators 80 and 81 are subtracted at 82 to provide the signal $-\lambda_{mq}$. The $\lambda_{md}$ signal is multiplied by the $i_{as}$ signal at a multiplier 84 and the product signal T+ is provided to a summer 85 and through a $1/\sqrt{3}$ coefficient multiplier 86 to a summer 87. The $i_{cs}$ signal is provided to a coefficient circuit 88 to multiply the signal by $2/\sqrt{3}$ and the output thereof is provided to the other input of the summer 87. The output of the summer 87, the $i_{ds}$ signal, is provided to a multiplier 89, which also receives the $-\lambda_{mq}$ signal, and the output of the multiplier, T−, is provided to the second input of the summer 85. The output of the summer 85 is passed through a circuit 91 to receive the coefficient $K_e P$ and yields the torque signal $T_e$.

Figure 9:
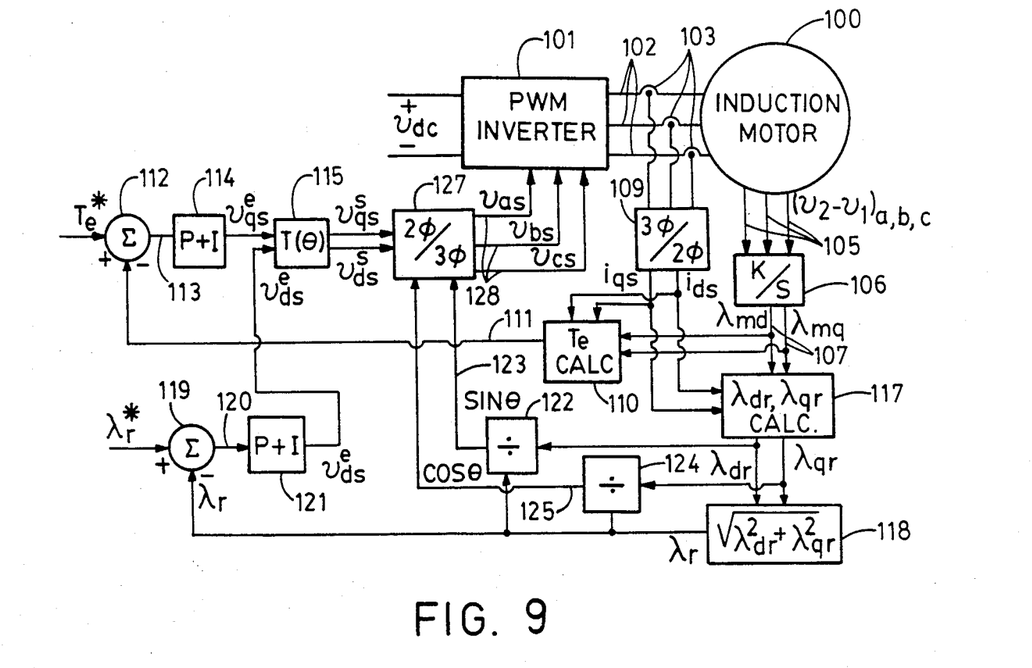
FIG. 9 is a block diagram of a motor control system for controlling torque and flux utilizing the invention.

The principles of the present invention are readily utilized to control an induction motor to meet preselected torque and flux control references. A block diagram of a control system for controlling the power supplied to a three-phase induction motor 100 by a pulse width modulated inverter 101, with respect to a preselected torque reference $T_e^*$ and a flux reference $\lambda_r^*$, is shown in FIG. 9. The inverter 101 receives DC power at its input and provides three-phase power on lines 102 to the motor 100. Current transformers 103 are connected in the lines 102 for measuring the phase currents. The voltage differences across pairs of coils in two or three phases of the motor 100 are brought out on output lines 105 and are integrated at 106 to provide the signals indicative of flux in the d and q axes on lines 107. The output signals from the current transformers 103 are provided to a circuit 109 which calculates the d and q currents $i_{ds}$ and $i_{qs}$ in the manner described above. As indicated above, the current signals $i_{qs}$ and $i_{ds}$ can be obtained utilizing measurements of currents across either two of the phase lines or all three of the phase lines, as desired. The signals indicative of current $i_{qs}$ and $i_{ds}$ and of flux $\lambda_{md}$ and $\lambda_{mq}$ are provided to a circuit 110 which calculates the electromagnetic torque $T_e$ as described above and provides an output signal indicative thereof on a line 111 to a summer 112 which subtracts the measured torque $T_e$ from the reference torque signal $T_e^*$ to provide an error output signal on a line 113. The error signal on the line 113 may be utilized to control the inverter 101 to maintain the motor 100 at a preferred level of torque. In accordance with the present invention, the control of the motor may be further enhanced for stability and response time by providing a proportional plus integral operation on the error signal on the line 113 at a block 114 to yield an error voltage $v_{qs}^e$. This error signal is provided to a torque error signal computation circuit 115 described further below.

To enable the inverter 101 to be controlled to also control the flux in the motor, the d axis and q axis flux signals on the lines 107 are provided to a calculation circuit 117 which also receives the $i_{qs}$ and $i_{ds}$ signals from the circuit 109. The circuit 117 calculates signals $\lambda_{dr}$ and $\lambda_{qr}$ in accordance with the following expressions:

$$\lambda_{qr} = \frac{(L_{Lr} + L_m)}{L_m} \lambda_{mq} - L_{Lr} i_{qs}$$

$$\lambda_{dr} = \frac{(L_{Lr} + L_m)}{L_m} \lambda_{md} - L_{Lr} i_{ds}$$

where $L_{Lr}$ is the rotor leakage inductance and $L_m$ is the magnetizing inductance. These are constants which may be calculated approximately for a given motor. The output signals $\lambda_{dr}$ and $\lambda_{qr}$ are provided to a circuit 118 which determines the square root of the sum of the squares of these signals to provide an output signal $\lambda_r$.

This output signal is provided to a summer 119 which subtracts the signal from the flux reference signal $\lambda_r^*$ to provide an error output signal on a line 120 to a proportional plus integral circuit 21. The output of this circuit is a voltage signal $v_{ds}^e$ which is provided to the calculation circuit 115. The $\lambda_{dr}$ signal and the $\lambda_r$ signal are provided to a divider 122 which provides an output signal on a line 123 corresponding to sin $\theta$ where sin $\theta = \lambda_{dr}/\lambda_r$. Similarly, the signal $\lambda_{qr}$ and the $\lambda_r$ signal are provided to a divider circuit 124 to provide an output signal on a line 125 which corresponds to the signal cos $\theta = \lambda_{qr}/\lambda_r$. The output signals on the lines 123 and 125 are provided to a selectable two-phase or three-phase operation circuit 127 which receives the output signals $v_{qs}^s$ and $v_s^s$ from the circuit 115.

The calculation circuit 115 provides output signals $v_{qs}^s$ and $v_{ds}^s$ in accordance with the following expressions:

$$V_{qs}^s = V_{qs}^e \cos\theta + V_{ds}^e \sin\theta$$

$$V_{ds}^s = -V_{qs}^e \sin\theta + V_{ds}^e \cos\theta$$

The two-phase or three-phase selection circuit 127 provides output signals on three lines 128 to the inverter 101, designated $v_{as}$, $v_{bs}$ and $v_{cs}$, in accordance with the following expressions:

$$V_{as} = V_{qs}^s$$

$$V_{bs} = -(1/2)V_{qs}^s - (\sqrt{3}/2)V_{ds}^s$$

$$V_{cs} = -(1/2)V_{qs}^s + (\sqrt{3}/2)V_{ds}^s$$

The inverter 101, of any suitable conventional design, utilizes these reference signals to adjust the output power on the lines 102 to the motor 100 to drive the motor to meet the torque reference variable $T_e^*$ and the motor flux reference $\lambda_r^*$.

It is understood that the invention is not confined to the particular embodiments disclosed herein for illustration, but embraces such modified forms thereof as come within the scope of the following claims.

The invention claimed is:

1. Apparatus for sensing air gap flux in an electrical machine of the type having a stator with a plurality of stator slots therein and a plurality of coils in the slots, the coils forming the winding for each phase of the machine arranged in at least one phase belt having series connected coils distributed over at least two slots, a rotor spaced from the stator to define an air gap therebetween, and also including electrical leads extending to connection to ends of two of the distributed coils in a phase belt for at least one phase of the machine such that the voltage across each such coil can be measured at the leads, comprising:
   (a) means for subtracting the voltage at the leads across one coil in each phase belt from the voltage across the other coil in the phase belt to provide a voltage difference signal for each phase to which the leads extend; and
   (b) means for integrating the voltage difference signal for each such phase to provide signals which are indicative of flux in the air gap.

2. The apparatus of claim 1 wherein there are three series connected coils in each phase belt distributed in consecutive slots for each phase, and wherein the electrical leads are connected to provide access to the voltages across the outer two coils in a phase belt for each phase.

3. The apparatus of claim 2 wherein the electrical machine has three phases and the electrical leads are connected to the outer two coils in a single phase belt in each of the three phases.

4. The apparatus of claim 3 wherein the stator has multiple poles and the coils to which the electrical leads extend for each phase are in phase belts for each of the three phases which are in the same pole of the machine.

5. The apparatus of claim 4 wherein the phase windings of the machine are connected in a Y configuration and wherein the phase belts to which the electrical leads extend for each phase are electrically connected together at the star point of the machine.

6. The apparatus of claim 4 wherein the windings on the stator are wound with a double layer lap winding.

7. The apparatus of claim 6 wherein the slot pitch of the windings is selected from the group of full pitch, single slot pitch, and two slot pitch.

8. The apparatus of claim 3 wherein one of the three phases is chosen as the q axis of the machine and wherein the means for integrating to provide signals indicative of air gap flux determines the flux $\lambda_{md}$ in the d axis which is in quadrature with the q axis in accordance with the expression $$\lambda_{md} = K\int(v_1 - v_3)_a dt$$

where $(v_1-v_3)_a$ is the voltage difference across the two coils in the phase chosen as the q axis and K is a proportionality constant.

9. The apparatus of claim 8 wherein the air gap flux $\lambda_{mq}$ in the q axis is also determined by the means for integrating and providing signals indicative of air gap flux in accordance with the expression $$-\lambda_{mq} = K/\sqrt{3} \, [\int(v_1 - v_3)_c dt - \int(v_1 - v_3)_b dt]$$

where $(v_1-v_3)_b$ and $(v_1-v_3)_c$ are the voltage differences between two coils in the selected phase belt in each of the other two phases of the machine and K is a proportionality constant.

10. A method of determining the air gap flux in an electrical machine of the type having a stator with a plurality of stator slots therein and a plurality of coils in the slots, the coils forming the winding for each phase of the machine arranged in at least one phase belt having series connected coils distributed over at least two slots, and also including a rotor spaced from the stator to define an air gap therebetween, comprising the steps of:
   (a) measuring the voltages across two of the distributed coils in a phase belt for at least one phase of the machine;
   (b) subtracting the measured voltage across one coil in each such phase belt from the measured voltage across the other coil in the phase belt to provide a voltage difference for each such phase; and
   (c) integrating the voltage differences for each such phase to provide signals which are indicative of flux in the air gap.

11. The method of claim 10 wherein the electrical machine has three series connected coils in each phase belt distributed in consecutive slots for each phase, and wherein the step of measuring the voltages is performed to measure the voltages across the outer two coils in a phase belt for each phase.

12. The method of claim 11 wherein the electrical machine has three phases and wherein the step of measuring measures the voltages across the outer two coils in a phase belt for each of the three phases.

13. The method of claim 12 wherein one of the three phases is chosen as the q axis of the machine and wherein the step of integrating to provide signals indicative of the air gap flux determines the flux $\lambda_{md}$ in the d axis which is in quadrature with the q axis in accordance with the expression $$\lambda_{md} = K \int (v_1 - v_3)_a dt$$

where $(v_1 - v_3)_a$ is the voltage difference across the two coils in the phase chosen as the q axis and K is a proportionality constant.

14. The method of claim 13 including the further step of determining the air gap flux in the q axis by integrating the voltage differences across the coils in selected phase belts in the other two phases of the machine and providing signals indicative of air gap flux $\lambda_{mq}$ in the q axis in accordance with the expression $$-\lambda_{mq} = K/\sqrt{3} \ [\int (v_1 - v_3)_c dt - \int (v_1 - v_3)_b dt]$$

where $(v_1 - v_3)_b$ and $(v_1 - v_3)$ are the voltage differences between the two coils in the selected phase belt in each of the other two phases of the machine and K is a proportionality constant.

15. Apparatus for determining the electromagnetic torque in an electrical machine of the type having a stator with a plurality of stator slots therein and a plurality of coils in the slots, the coils forming the winding for each phase of the machine arranged in at least one phase belt having series connected coils distributed over at least two slots, a rotor spaced from the stator to define an air gap therebetween, and also including electrical leads extending to connection to ends of two of the distributed coils in a phase belt for each phase of the machine such that the voltage across each such coil can be measured at the leads, comprising:
(a) means for subtracting the voltage at the leads across one coil in each phase belt from the voltage across the other coil in the phase belt to provide a voltage difference signal for a number of phases sufficient to determine the flux in the machine;
(b) means for integrating the voltage difference signal for each phase to provide signals which are indicative of air gap flux in an axis along one phase chosen as the q axis and the air gap flux along an axis in quadrature therewith chosen as the d axis;
(c) means for measuring the stator phase currents and providing signals indicative thereof; and
(d) means, receiving the signals indicative of flux in the q and d axes and the stator phase currents, for determining electromagnetic torque and providing a signal indicative thereof as a function of the signals indicative of the flux in the q and d axes and of the stator phase currents.

16. The apparatus of claim 15 wherein there are three series connected coils in each phase belt distributed in consecutive slots for each phase, and wherein the electrical leads are connected to provide access to the voltages across the outer two coils in a phase belt for each phase.

17. The apparatus of claim 16 wherein the electrical machine has three phases and the electrical leads are connected to the outer two coils in a single phase belt in each of the three phases.

18. The apparatus of claim 17 wherein one of the three phases is chosen as the q axis of the machine and wherein the means for integrating to provide signals indicative of the air gap flux determines the flux $\lambda_{md}$ in the d axis which is in quadrature with the q axis in accordance with the expression $$\lambda_{md} = K \int (v_1 - v_3)_a dt$$

where $(v_1 - v_3)_a$ is the voltage difference across the two coils in the phase chosen as the q axis, and wherein the means for integrating to provide signals indicative of air gap flux also determines the air gap flux $\lambda'_{mq}$ in the q axis in accordance with the expression $$-\lambda_{mq} = K/\sqrt{3} \ [\int (v_1 - v_3)_c dt - \int (v_1 - v_3)_b dt]$$

where $(v_1 - v_3)_b$ and $(v_1 - v_3)_c$ are the voltage differences between two coils in the selected phase belt in each of the other two phases of the machine and K is a proportionality constant.

19. The apparatus of claim 18 wherein the means for determining electromagnetic torque provides an output signal indicative of the electromagnetic torque $T_e$ in accordance with the expression:

$$T_e = K_e P(\lambda_{md} i_{qs} - \lambda_{mq} i_{ds})$$

where $K_e$ is a constant, P is the number of stator poles, $i_{qs}$ is the current in the one chosen phase and $$i_{ds} = (i_{cs} - i_{bs})/\sqrt{3} \ ,$$

where $i_{cs}$ and $i_{bs}$ are the currents in the other two stator phases.

20. The apparatus of claim 17 wherein the stator has multiple poles and the coils to which the electrical leads extend for each phase are in phase belts for each of the three phases which are in the same pole of the machine.

21. The apparatus of claim 20 wherein the phase windings of the machine are connected in a Y configuration and wherein the phase belts to which the electrical leads extend for each phase are electrically connected together at the star point of the machine.

22. The apparatus of claim 20 wherein the windings on the stator are wound with a double layer lap winding.

23. The apparatus of claim 22 wherein the slot pitch of the windings is selected from the group of full pitch, single slot pitch, or two slot pitch.

24. A method of determining the electromagnetic torque in an AC electrical machine of the type having a stator with a plurality of stator slots therein and a plurality of coils in the slots, the coils forming the winding for each phase of the machine arranged in at least one phase belt having series connected coils distributed over at least two slots, and also including a rotor spaced from the stator to define an air gap therebetween, comprising the steps of:
(a) measuring the voltages across two of the distributed coils in a phase belt for a number of phases sufficient to determine the flux in the machine;

(b) subtracting the measured voltage across one coil in each phase belt from the measured voltage across the other coil in the phase belt to provide a voltage difference for each phase;

(c) integrating the voltage differences for each phase to provide signals which are indicative of air gap flux in an axis along one phase chosen as the q axis and of the air gap flux along an axis in quadrature therewith chosen as the d axis;

(d) measuring the stator phase currents and providing signals indicative thereof; and (e) calculating the electromagnetic torque of the machine as a function of the signals indicative of the flux in the q and d axes and of the stator phase currents.

25. The method of claim 24 wherein the electrical machine has three series connected coils in each phase belt distributed in consecutive slots for each phase, and wherein the step of measuring the voltages is performed to measure the voltages across the outer two coils in a phase belt for each phase.

26. The method of claim 25 wherein the electrical machine has three phases and wherein the method of measuring measures the voltage across the outer two coils in a phase belt for each of the three phases.

27. The method of claim 26 wherein one of the three phases is chosen as the q axis of the machine and wherein the step of integrating to provide signals indicative of the air gap flux determines the flux $\lambda_{md}$ in the d axis which is in quadrature with the q axis in accordance with the expression $$\lambda_{md} = K \int (v_1 - v_3)_a dt$$

where $(v_1 - v_3)_a$ is the voltage difference across the two coils in the phase chosen as the q axis, and further including the step of determining the air gap flux in the q axis by determining the voltage differences across the coils in selected phase belts in the other two phases of the machine and providing signals indicative of air gap flux $\lambda_{mq}$ in the q axis in accordance with the expression $$-\lambda_{mq} = K/\sqrt{3} \, [\int (v_1 - v_3)_c dt - \int (v_1 - v_3)_b dt]$$

where $(v_1 - v_3)_b$ $(v_1 - v_3)_c$ are the voltage differences between the two coils in the selected phase belt in each of the other two phases of the machine and K is a proportionality constant.

28. The method of claim 27 wherein in the step of calculating electromagnetic torque, the electromagnetic torque $T_e$ is calculated in accordance with the expression:

$$T_e = K_e P (\lambda_{md} i_{qs} - \lambda_{mq} i_{ds})$$

where $K_e$ is a constant, P is the number of stator poles, $i_{qs}$ is the current in the one chosen phase, and $$i_{ds} = (i_{cs} - i_{bs})/\sqrt{3},$$

where $i_{cs}$ and $i_{bs}$ are the currents in the other two stator phases.

29. In an electrical machine of the type having a stator with a plurality of stator slots therein and a plurality of coils in the slots, the coils forming the winding for each phase of the machine arranged in at least one phase belt having series connected coils distributed over at least two slots, and also including a rotor spaced from the stator to define an air gap therebetween, the improvement adapting the machine for flux and torque measurements comprising:

electrical leads extending from terminals outside of the machine to connection to ends of two of the distributed coils in a phase belt for at least one phase of the machine such that the voltage across each such coil can be measured at the terminals of the leads.

30. The machine of claim 29 wherein there are three series connected coils in each phase belt distributed in consecutive slots for each phase, and wherein the electrical leads are connected to provide access to the voltages across the outer two coils in a phase belt for each phase.

31. The electrical machine of claim 30 wherein the electrical machine has three phases and the electrical leads are connected to the outer two coils in a single phase belt in each of the three phases.

32. The apparatus of claim 31 wherein the stator has multiple poles and the coils to which the electrical leads extend for each phase are in phase belts for each of the three phases which are in the same pole of the machine.

33. The machine of claim 32 wherein the phase windings of the machine are connected in a Y configuration and wherein the phase belts to which the electrical leads extend for each phase are electrically connected together at the star point of the machine.

34. The machine of claim 32 wherein the windings on the stator are wound with a double layer lap winding.

35. The machine of claim 34 wherein the slot pitch of the windings is selected from the group of full pitch, single slot pitch, and two slot pitch.

36. A control system for regulating an inverter supplying variable frequency power to an electrical machine of the type having a stator with a plurality of stator slots therein and a plurality of coils in the slots, the coils forming the windings for each phase of the machine arranged in at least one phase belt having series connected coils distributed over at least two slots, a rotor spaced from the stator to define an air gap therebetween, and also including electrical leads extending to connection to ends of two of the distributed coils in a phase belt for at least one phase of the machine such that the voltage across each such coil can be measured at the leads, comprising:

(a) means for subtracting the voltage at the leads across one coil in each phase belt from the voltage across the other coil in the phase belt to provide a voltage difference signal for a sufficient number of phases to determine the flux in the machine;

(b) means for integrating the voltage difference signal for each phase to provide signals which are indicative of air gap flux in an axis along one phase chosen as the q axis and the air gap flux along an axis in quadrature therewith chosen as the d axis;

(c) means for measuring the stator phase currents and providing signals indicative thereof;

(d) means, receiving the signals indicative of flux in the q and d axes and the stator phase currents, for determining the electromagnetic torque and providing a signal indicative thereof as a function of the signals indicative of the flux in the q and d axes and of the stator phase current; and (e) control means responsive to the signals indicative of flux and electromagnetic torque for controlling the operation of the inverter to provide power to the electrical machine to drive it to produce flux and torque signals which are controlled to follow selected values of torque and flux.

37. The system of claim 36 wherein there are three series connected coils in each phase belt distributed in consecutive slots for each phase, and wherein the electrical leads are connected to provide access to the voltages across the outer two coils in a phase belt for each phase.

38. The system of claim 37 wherein the electrical machine has three phases and the electrical leads are connected to the outer two coils in a single phase belt in each of the three phases.

39. The system of claim 38 wherein one of the three phases is chosen as the q axis of the machine and wherein the means for integrating to provide signals indicative of the air gap flux determines the flux $\lambda_{md}$ in the d axis which is in quadrature with the q axis in accordance with the expression $$\lambda_{md} = K \int (v_1 - v_3)_a dt$$

where $(v_1 - v_3)_a$ is the voltage difference across the two coils in the phase chosen as the q axis, and wherein the means for integrating to provide signals indicative of air gap flux also determines the air gap flux $\lambda_{mq}$ in the q axis in accordance with the expression $$-\lambda_{mq} = K/\sqrt{3} \; [\int (v_1 - v_3)_c dt - \int (v_1 - v_3)_b dt]$$

wherein $(v_1 - v_3)_b$ and $(v_1 - v_3)_c$ are the voltage differences between two coils in the selected phase belt in each of the other two phases of the machine and K is a proportionality constant.

40. The system of claim 39 wherein the means for determining electromagnetic torque provides an output signal indicative of the electromagnetic torque $T_e$ in accordance with the expression:

$$T_e = K_e P(\lambda_{md} i_{qs} - \lambda_{mq} i_{ds})$$

where $K_e$ is a constant, P is the number of stator poles, $i_{qs}$ is the current in the one chosen in one chosen phase and $$i_{ds} = (i_{cs} - i_{bs})/\sqrt{3},$$

where $i_{cs}$ and $i_{bs}$ are the currents in the other two stator phases.

41. The system of claim 38 wherein the stator has multiple poles and the coils to which the electrical leads extend for each phase are in phase belts for each of the three phases which are in the same pole of the machine.

42. The system of claim 41 wherein the phase windings of the machine are connected in a Y configuration and wherein the phase belts to which the electrical leads extend for each phase are electrically connected together at the star point of the machine.

43. The system of claim 41 wherein the windings on the stator are wound with a double layer lap winding.

44. The system of claim 43 wherein the slot pitch of the windings is selected from the group of full pitch, single slot pitch, or two slot pitch.

* * * * *

UNITED STATES PATENT AND TRADEMARK OFFICE
CERTIFICATE OF CORRECTION

PATENT NO.  : 4,724,373
DATED       : February 9, 1988
INVENTOR(S) : Thomas A. Lipo, Chang Kwong Choy It is certified that error appears in the above-identified patent and that said Letters Patent are hereby corrected as shown below:

Title page, change "Inventor: Thomas A. Lipo, Madison, Wis." to --Inventors: Thomas A. Lipo, Madison, Wis., Chang Kwong Choy, West Malaysia--.

Column 13, line 29, change "$(V_1-V_3)$" to --$(V_1-V_3)_c$--.

Signed and Sealed this

Twelfth Day of July, 1988

Attest:

DONALD J. QUIGG

Attesting Officer

Commissioner of Patents and Trademarks